UNITED STATES PATENT OFFICE.

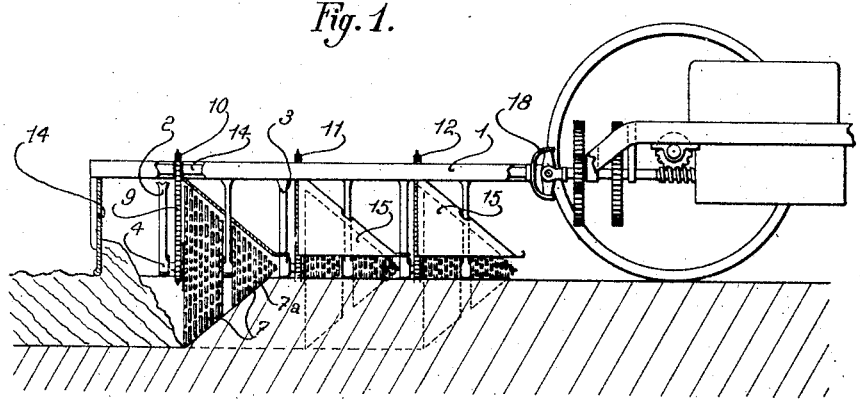
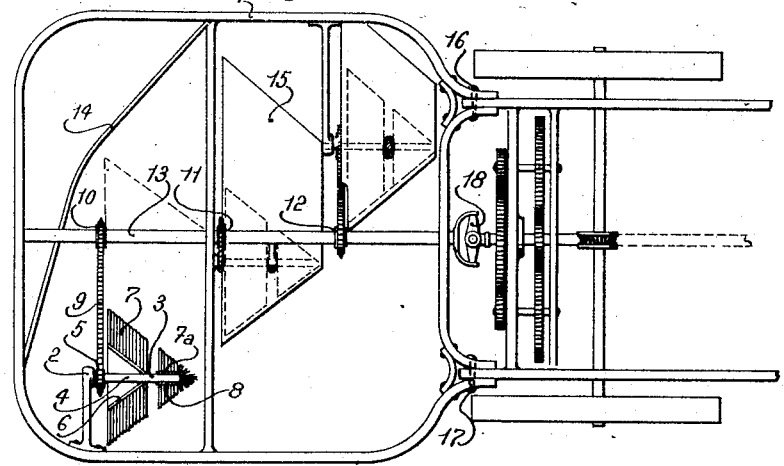
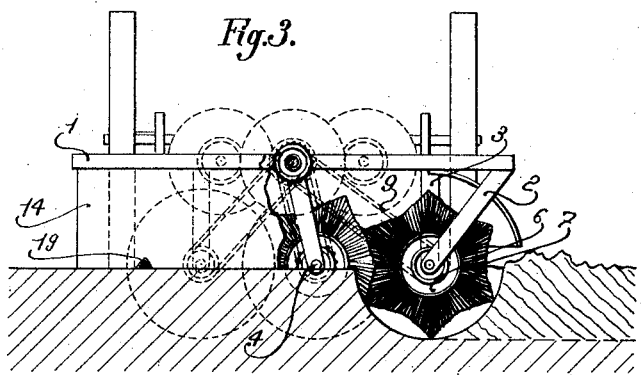

ALBERT PETIT, OF MARSEILLE, FRANCE.

TILLING APPARATUS FOR SELF-PROPELLED TILLING-MACHINES.

1,365,192.

Specification of Letters Patent.   Patented Jan. 11, 1921.

Application filed July 26, 1920. Serial No. 399,116.

*To all whom it may concern:*

Be it known that I, ALBERT PETIT, a citizen of the French Republic, residing at No. 11 Passage Bensa, Marseille, Bouches-du-Rhône, France, have invented certain new and useful Improvements in Tilling Apparatus for Self-Propelled Tilling-Machines, of which the following is a specification.

This invention has for its object to provide an improved tilling apparatus for self-propelled tilling machines.

The improved apparatus comprises rotary conical brushes fixed in a suitable manner to the rear portion of the chassis of a motor vehicle and actuated by a motor carried by said vehicle. Each of these conical brushes is constituted by a plurality of grouped flexible metal stems which by rotating, act after the fashion of brushes in such a manner as to excavate a furrow.

The said cones are so arranged that when the first conical brush has passed, the soil projected by the second conical brush will fill up the furrow excavated by the first conical brush, and so on in the case of the next following conical brushes.

The furrow formed by the last conical brush is covered up by the soil thrown up by the first conical brush, the said soil being conveyed to the said furrow by a guiding apron located at the rear of the apparatus.

A suitable hood or casing arranged over each conical brush serves as a guide for the thrown-up soil.

The frame carrying the tilling apparatus may be pivotally connected to the longitudinal of the motor vehicle; the transmission of the power from the motor to the tilling conical brushes being effected through a cardan located in the axis of the pivotal joints.

These pivotal joints allow of varying the depth of the tilling and of removing entirely the conical brushes when the work is finished.

An embodiment of this invention is illustrated by way of example in the accompanying drawings in which:—

Figure 1 is a side elevation;

Fig. 2 is a plan of the improved apparatus; and

Fig. 3 is a rear end elevation.

As shown, 1 is a chassis on which are mounted supports 2 and 3 whose lower ends form bearings in which rotates a shaft 4 carrying a pinion 5. A conical brush divided into two portions is fixed on the shaft 4.

The first portion comprises a cone 6 of metal plate or any other suitable material. This metal plate may consist of one piece and soldered, or of a plurality of pieces riveted or bolted together. Upon the outer surface of this cone 6 there are fixed flexible metal stems 7. The other portion of the conical brush consists of a sleeve 8 which is screwed on the shaft 4, and on the surface of which other flexible metal stems 7ª are fixed. These stems are arranged in coaxial groups each composed of a plurality of such stems. The outer surface of each conical brush may have a strictly circular contour as shown in Figs. 1 and 2, or it may have an indented or star-like contour as shown for example in Fig. 3.

The pinions 5 are connected by means of gear chains 9 to the pinions 10, 11 and 12 mounted on a shaft 13 driven from the motor.

When the apparatus is in motion the shaft 13 imparts its rotary motion through the medium of the chains 9 and the pinions 10, 11 and 12 to the shafts 4 and the tilling conical members 6. Since their rotary motion is combined with the progressive travel of the apparatus as a whole, the said conical members will cut a furrow which is covered up by the soil that is projected by the next following cone. The last cone receives the soil that is projected from the first conical member, which soil is conveyed to it by means of a guiding apron 14. A hood or casing 15 located over each cone serves as a guide for the projected soil.

The frame of the apparatus has two joints 16 and 17 to allow of raising the cones. The shaft 13 is connected to the motor through a cardan 18 located on the axis of the joints 16 and 17. A notch 19 serves as a register mark by marking along the ground a guide line in the form of a low ridge along which the wheels opposite the said notch must pass in the return travel of the apparatus.

What I claim is:—

1. In a tilling apparatus, the combination of a series of rotary conical brush-like tilling implements rotatable about axes arranged parallel to the line of draft and having their apexes arranged toward the front, each implement consisting of a plurality of radially extending flexible stems of a size and material suitable for cutting ordinary soil, said tilling implements being arranged in a line extending diagonally to the line of draft, means for rotating said tilling implements, and shields arranged above said implements for directing the soil thrown by said implements.

2. In a tilling apparatus for a self-propelled tilling machine, the combination of a series of rotary conical brush-like tilling implements each composed of a plurality of coaxially grouped flexible stems of metal or other suitable material, which by their combined rotation and progressive travel cut a corresponding number of furrows in the soil, said conical tilling implements being arranged in staggered series longitudinally of the apparatus, and a guiding apron located behind the hindmost implement for conveying soil from the first furrow to the last furrow.

3. A tilling apparatus comprising a frame carrying a driven shaft, a plurality of longitudinally extending shafts arranged beneath the frame and supported by said frame, said last named shafts being successively arranged in inclined relation to each other, a gear fixed to each of said longitudinally extending shafts, gears fixed to the driven shaft, power transmitting means forcing the gears of the driven shafts to the gears of the longitudinally extending shafts, rotary conical brush-like tilling implements each composed of a plurality of coaxially grouped flexible stems of metal, fixed to the longitudinally extending shafts, shields mounted above said implements and shaped to direct the soil thrown thereby, and a guiding apron located rearwardly of said implements for conveying soil from the first furrow to the last furrow.

In testimony whereof I have signed my name to this specification.

ALBERT PETIT.

Witnesses:
 L. B. B. SPARKS,
 D. C. WOODS.